(12) United States Patent
Shkondin

(10) Patent No.: US 7,468,587 B2
(45) Date of Patent: Dec. 23, 2008

(54) ALL WHEEL DRIVE VEHICLE

(75) Inventor: Vasily Vasilievich Shkondin, Moscow (RU)

(73) Assignee: Ultra Motor Company Limited, Liverpool (GB)

( * ) Notice: Subject to any disclaimer, the term of this patent is extended or adjusted under 35 U.S.C. 154(b) by 0 days.

(21) Appl. No.: 11/995,990

(22) PCT Filed: Jul. 6, 2006

(86) PCT No.: PCT/GB2006/050191

§ 371 (c)(1),
(2), (4) Date: Jan. 17, 2008

(87) PCT Pub. No.: WO2007/010300

PCT Pub. Date: Jan. 25, 2007

(65) Prior Publication Data

US 2008/0211432 A1    Sep. 4, 2008

(30) Foreign Application Priority Data

Jul. 21, 2005   (RU) ............................. 2005123183

(51) Int. Cl.
*H02P 5/00*    (2006.01)
*B60L 11/18*    (2006.01)

(52) U.S. Cl. ..................... 318/34; 318/51; 318/139; 310/148; 310/151

(58) Field of Classification Search ............. 318/34, 318/8, 111, 113, 139; 310/219, 180, 148, 310/151

See application file for complete search history.

(56) References Cited

U.S. PATENT DOCUMENTS 3,447,537 A    6/1969    King (Continued)

FOREIGN PATENT DOCUMENTS

EP    0 622 264    11/1994

(Continued)

OTHER PUBLICATIONS

International Search Report for PCT/GB2006/050191 dated Jul. 6, 2006.

*Primary Examiner*—Paul Ip
(74) *Attorney, Agent, or Firm*—Pearl Cohen Zedek Latzer LLP

(57) ABSTRACT

The present invention relates to the field of electric-motor-driven vehicles such as cars, motorcycles, scooters, electric-motor trains, etc. Embodiments of the invention seek to provide an economic all-wheel-drive (AWD) vehicle possessing high dynamic characteristics and a relatively simple scheme of control over the operation of electric motors. An AWD vehicle according to the disclosed invention contains at least two gearless (direct-drive) electric motors, an electric power supply source, and an electric motor power supply control unit. At least one of said motors is a start-up (barring) motor and at least one is a cruise (propulsion) motor. Each of said motors comprises (i) at least one circular magnetic conductor on which an even number of permanent magnets are uniformly arranged with a certain pitch; (ii) a circular frame separated from said magnetic conductor by an air gap and bearing an even number of electromagnets arranged in pairs one opposite to another; and (iii) a device switching the polarity of voltage applied to said electromagnets. Each pair of electromagnets situated one opposite to another corresponds to a certain phase of the electric motor, the number ($m_1$) of phases in the start-up electric motor and the number ($m_2$) of phases in the cruise electric motor obey the relation $m_1 > m_2$. It is also desired that the number ($n_1$) of permanent magnets in the start-up electric motor and the number ($n_2$) of permanent magnets in the cruise electric motor would obey the relation $n_1 > n_2$. The power supply control unit can feed each electric motor separately and independently.

16 Claims, 8 Drawing Sheets

U.S. PATENT DOCUMENTS

| | | | |
|---|---|---|---|
| 4,378,855 | A | 4/1983 | Haub et al. |
| 5,762,156 | A | 6/1998 | Bates et al. |
| 5,764,283 | A | 6/1998 | Pingali et al. |
| 5,765,656 | A | 6/1998 | Weaver |
| 6,213,234 | B1 | 4/2001 | Rosen et al. |
| 6,384,496 | B1 | 5/2002 | Pyntikov et al. |
| 6,492,756 | B1 | 12/2002 | Maslov et al. |
| 6,617,746 | B1 | 9/2003 | Maslov et al. |
| 6,975,054 | B2 * | 12/2005 | Shkondin .................... 310/148 |
| 7,285,889 | B2 * | 10/2007 | Shkondin .................... 310/148 |
| 2002/0024305 | A1 * | 2/2002 | Itoh et al. .................... 318/34 |
| 2003/0019674 | A1 | 1/2003 | Duan |
| 2003/0234124 | A1 | 12/2003 | Pecnik et al. |
| 2004/0040755 | A1 | 3/2004 | Swindell et al. |
| 2004/0176203 | A1 | 9/2004 | Supina et al. |
| 2004/0239204 | A1 * | 12/2004 | Shkondin .................... 310/219 |
| 2005/0052080 | A1 * | 3/2005 | Maslov et al. .............. 307/10.1 |

FOREIGN PATENT DOCUMENTS

| | | |
|---|---|---|
| RU | 2 129 965 | 10/1999 |
| RU | 2 172 261 | 8/2001 |
| WO | WO 93/08999 | 10/1991 |
| WO | WO 2004/085186 | 10/2004 |
| WO | WO 2004/091957 | 10/2004 |

* cited by examiner

ALL WHEEL DRIVE VEHICLE

CROSS-REFERENCE TO RELATED APPLICATIONS

This application is a National Phase Application of PCT International Application No. PCT/GB2006/505191, International Filing Date Jul. 6, 2006, claiming priority of UK Patent Application, 2005123183, filed Jul. 21, 2005, which is hereby incorporated by reference in its entirety.

FIELD OF THE INVENTION

The present invention relates to the field of electric-motor-driven vehicles such as cars, motorcycles, scooters, electric-drive trains, etc. In particular, this invention relates to all-wheel-drive vehicles.

BACKGROUND OF THE INVENTION

By definition, all-wheel-drive (AWD) vehicles are those in which every wheel, or every set of wheels located on or sharing the same axis or axle, is provided with a separate motor. Since the use of several motors leads to a significant increase in power consumption, the most widely used in practice are the so-called hybrid vehicles employing at least one combination of an electric motor and a generator powered by an organic fuel. Technical solutions known from the prior art include an AWD vehicle with electric power supply from a liquid or gas turbine (U.S. Pat. No. 6,213,234, "Vehicle Powered By a Fuel Cell/Gas Turbine Combination"), a hybrid system employing a turbine engine (U.S. Pat. No. 5,762,156, "Hybrid Electric Propulsion System Using a Dual Shaft Turbine Engine"), a hybrid electric-motor drive (U.S. Pat. No. 5,765,656, "Hybrid Electric Motor Vehicle Drive"), and an electric drive system (U.S. Pat. No. 5,764,283, "Electric Propulsion System For a Vehicle"), among others.

All these disclosures relate to transport vehicles employing more than one electric motor, and some of them employ a separate motor for each wheel. In all cases, the vehicles are provided with at least two sources of power supply to the electric motors: a gas or liquid turbine and an electric accumulator or battery. The turbine operates as a normal electricity generator and powers the electric motors or charges the battery. The schemes of connecting the sources of power to the electric motors can be different. For example, an electric-motor car disclosed in U.S. Pat. No. 3,447,537 is equipped with a gas turbine, which acts as a generator for supplying power to electric motors driving each wheel. In one possible variant, the motors are powered from electric batteries, which in turn are charged from the generator.

In all the above devices, torque is transferred from the shaft of an electric motor to a wheel by means of a drive or a transmission mechanism. Another example is offered by patent application WO 2004/085186, which describes a vehicle comprising a distributed system of electric motors with a central controller. Each driving wheel is provided with a separate motor and a mechanical transmission. The proposed device can employ electric motors of various types, depending on the power source and the required characteristics. In particular, the vehicle can be supplied with power from a turbine generator and/or electric batteries. The motion of this vehicle is controlled by a complicated system, which synchronizes the electric motors and switches the transmission mechanisms.

Other examples and variants of AWD vehicles, transmission mechanisms, and control systems for electric motors and transmission have been described in U.S. patent applications 2003/0019674, U.S. 2003/0234124 and U.S. 2004/0176203.

These known AWD vehicles use mechanical drives to transfer the torque from the shaft of an electric motor to a wheel, and use mechanical transmission mechanisms to change the velocity of motion. This approach complicates the design and reduces the reliability of the system of control and synchronization of separate motors. Therefore the reliability of the whole vehicle is reduced.

Also known from the prior art is a gearless (direct-drive) motor-in-wheel (motor-wheel), whereby the wheel rotation is caused directly by the electromagnetic interaction of the magnetic systems of a stator and a rotor. Such systems, involving no mechanical drives and transmission mechanisms, offer promising technical solutions for transport vehicles.

One built-in motor known in the prior art (WO 93/08999 A1, 13.05.93) comprises two main parts: an immobile stator, mounted on an axis and provided with a magnetic conductor and a set of uniformly arranged permanent magnets, and a mobile rotor bearing a rim and containing at least two groups of electromagnets. A collector/distributor is mounted on the stator and provided with current-conducting plates connected to a dc current source. Said rotor bears current collectors which make electrical contact with the plates of the collector distributor.

Said motor-wheel can be implemented in several modifications and variants (U.S. Pat. No. 6,384,496 B1, 07.05.2002; U.S. Pat. No. 6,617,746 B1, 09.09.2003; Russian Patent 2,129,965 C1, 10.05.1999; Russian Patent No. 2,172,261 C1, 20.08.2001). Advantages of this design are the absence of a reducing gear, the use of low-voltage power sources, absence of supplementary electronic circuits, the possibility of energy recuperation, and relatively small size and weight characteristics. By combining the main elements of said motor-wheel with auxiliary elements, it is possible to create a variety of analogous devices retaining all the advantages of the motor-wheel.

However, the aforementioned motor-wheel and its analogs still have some disadvantages, the main of these being the need for large start and transient currents in the course of starting and accelerating the vehicle. This leads to rapid degradation and a decrease in the working life of storage batteries and to unfavourable thermal regimes. Another drawback is a low efficiency of the use and recovery of electric energy. Finally, said motor-wheels are characterized by relatively low torque, which considerably reduces the field of their possible practical applications.

Another motor employing a resonance scheme, which reduces the aforementioned disadvantages, has been described in the patent application WO 2004/091957 A1, 28.10.2004. Said motor contains an even number of electromagnets arranged in pairs, one opposite to another, with the terminals of opposite coils shunted by capacitors forming resonance circuits. The number (n) of permanent magnets in the stator and the number (m) of electromagnets (and resonance circuits) in the rotor are selected so as to obey the relations $n=10+4k$, and $m=2+k$, where k is an arbitrary integer ($k=0, 1, 2, \ldots$). For the proposed arrangement of magnets and the adopted scheme of commutation, these relations provide for a resonance of currents in the coils of the opposite electromagnets, which decreases the voltage jumps (and the energy consumption) in the start-up and acceleration regimes and improves dynamic characteristics of the motor. However, since the resonance of currents takes place only at a certain frequency of rotation, the optimum regime of motion of a vehicle employing said motor-wheel corresponds to a certain preset velocity (or a velocity interval).

BRIEF SUMMARY OF THE DISCLOSURE

Embodiments of the present invention seek to provide an economic AWD vehicle possessing high dynamic characteristics and a relatively simple scheme of control over the operation of electric motors.

According to the present invention, there is provided an all-wheel-drive vehicle including at least two gearless (direct-drive) electric motors, an electric power supply source, and an electric motor power supply control unit, wherein each of said motors comprises:
 (i) at least one annular magnetic conductor on which an even number of permanent magnets are uniformly arranged with a predetermined pitch;
 (ii) an annular frame separated from said magnetic conductor by an air gap and bearing an even number of electromagnets arranged in pairs one opposite to another; and
 (iii) a device for switching the polarity of a potential difference applied to said electromagnets, where a number $m_1$ of the pairs of opposing electromagnets in one electric motor and a number $m_2$ of the pairs of opposing electromagnets in the other electric motor obey the relation $m_1 > m_2$ and the power supply control unit is adapted to feed each electric motor separately and independently.

At least one of said motors may be a start-up (or barring) motor and at least one may be a cruising (propulsion) motor.

Each pair of electromagnets situated one opposite to another corresponds to a certain phase of the electric motor. The number ($m_1$) of phases (i.e., of the pairs of opposite electromagnets) in the start-up electric motor and the number ($m_2$) of phases in the cruising electric motor obey the relation $m_1 > m_2$.

Preferably, a number ($n_1$) of permanent magnets in the start-up electric motor and a number ($n_2$) of permanent magnets in the cruising electric motor obey the relation $n_1 > n_2$.

Said electric motors can all be of either of a commutator or commutator-less type, or one motor can be of the commutator type and the other of the commutator-less type (inverter or brushless scheme). In embodiments with a commutator motor, the magnetic conductor of the electric motor is usually mounted on the stator and the annular frame with electromagnets is mounted on the rotor.

The device for switching the polarity of the voltage or potential difference applied to the electromagnets may comprise a collector distributor mounted on the stator body, containing (i) current-conducting plates separated by insulating spacers and (ii) current collectors (brushes) mounted on the rotor and capable of contacting the plates of the collector distributor. The collector plates are connected with alternating polarity to a dc current source, while the brushes are connected to identical terminals of the windings of said electromagnets.

For an electric motor with a single direction of rotation, the positive current-conducting plates of the collector distributor are connected to the positive output of the dc power supply unit, and the negative current-conducting plates of the collector distributor are connected to the electric motor case.

For an electric motor of the reversible type, the positive current-conducting plates of the collector distributor are connected to the positive output of the dc power supply unit, while the negative current-conducting plates of the collector distributor are connected to the negative output of the dc power supply unit and insulated from the case. The connection scheme is determined by the destination of each particular motor in the AWD vehicle.

In embodiments with an inverter motor, the magnetic conductor of the electric motor is situated on the rotor, the annular frame with the electromagnets is mounted on the stator, and the device for switching the polarity of the voltage applied to the electromagnets comprises an inverter, which switches the direction of current passing in the coils of the electromagnets in accordance with the electric motor rotation frequency.

Irrespective of the particular configuration of the device for switching the polarity of the voltage applied to the electromagnets, it is preferred that each electromagnet comprises two coils with opposite winding directions, which are connected in series. The coils of adjacent electromagnets are also connected in series, and corresponding identical terminals of the opposite electromagnets are connected to each other.

In preferred embodiments, the number (n) of permanent magnets obeys the relation n=10+4k, where k is an arbitrary integer (k=0, 1, 2, ... ). The number (m) of the pairs of opposite electromagnets preferably obeys the relation m=2+L, where L is any integer such that $0 \leq L \leq k$.

The electric motors of embodiments of the present invention can be implemented so that the rotor is arranged either outside or inside the stator, depending on the particular design of an AWD vehicle.

In a cruising regime, the start-up electric motor (having a greater number of phases than that in the cruising motor) can be used as an electric generator for electric energy recuperation. In this case, the power source unit typically contains two sets of batteries, which can be alternatively switched so that one set supplies power to the cruising motor and the other is charged from the start-up electric motor operating as an electric generator. As the first set of batteries is discharged to a certain level, the two sets of batteries are switched so as to change their functions. Since pulsed inertial motors are highly effective low-voltage (48-72V) devices, a double set of batteries for a vehicle according to embodiments of the present invention will correspond to a standard set (120-150V) for a modern electric-motor car and will not require much additional space for accommodation on board the vehicle.

The AWD vehicle of embodiments of the present invention may further comprise an electric generator working on an organic (e.g. petrochemical) fuel. Such a generator can either directly supply power to the electric motors or it can charge the batteries.

The AWD vehicle of embodiments of the present invention may comprise at least two identical electric motors on a single axis or axle.

At least two of said electric motors may be connected in series to the electric power supply source.

There may further be provided means for changing the mode of connection of said electric motors to the power supply source from serial to parallel and vice versa.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF THE DRAWINGS

For a better understanding of the present invention and to show how it may be carried into effect, reference shall now be made by way of example to the accompanying drawings, in which.

DETAILED DESCRIPTION

Figure 1:
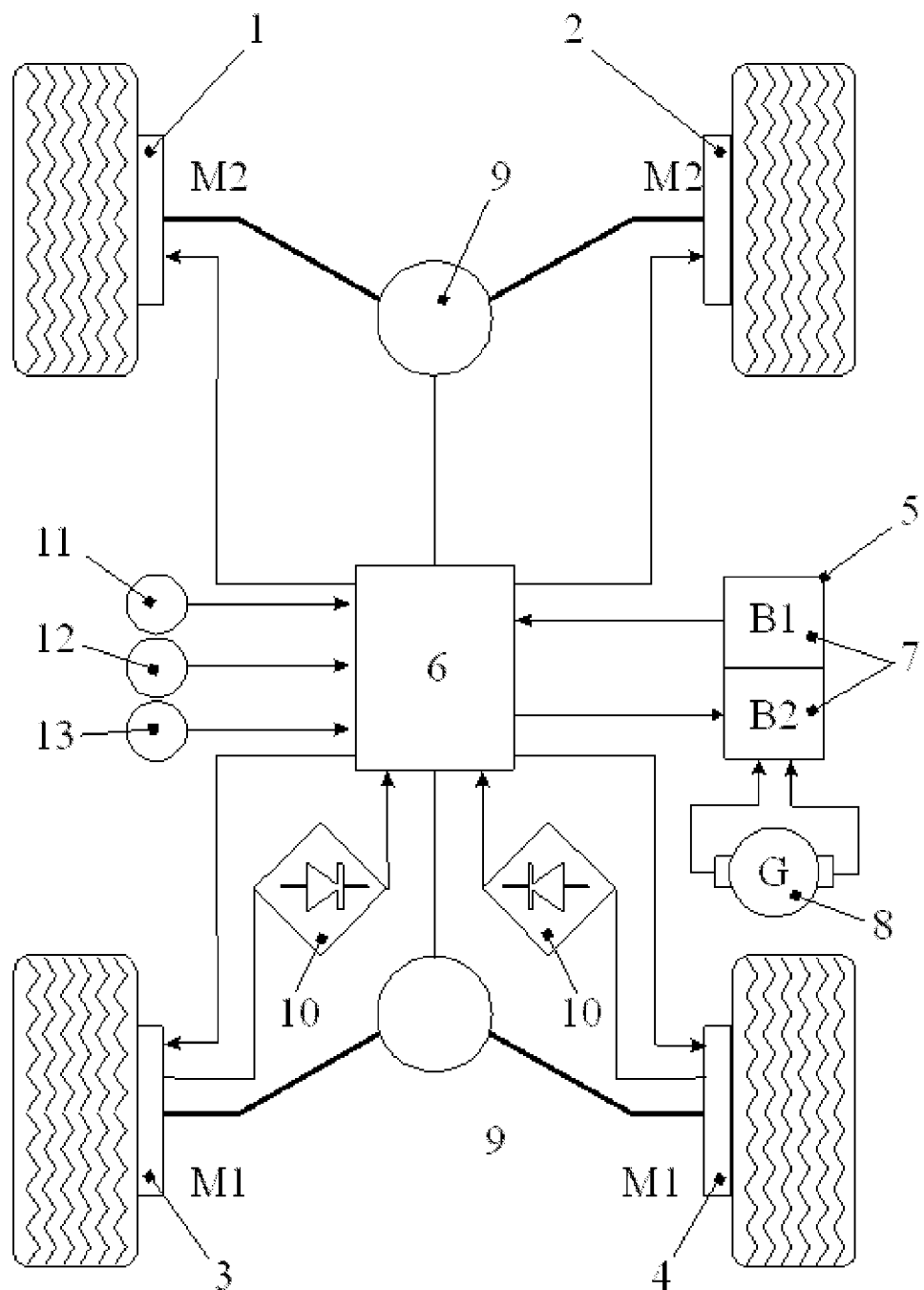
FIG. 1 shows the general configuration of an AWD vehicle of an embodiment of the present invention.

FIG. 1 shows the general scheme of an AWD vehicle (electric-motor car) of an embodiment of the present invention. The electric-motor car has four gearless electric motors (1, 2, 3 and 4). The electric motors (1 and 2) situated on one axis (M1), as well as the electric motors (3 and 4) situated on another axis (M2), are identical. In this scheme, motors 3 and 4 are the start-up motors and are supplied with power according to a reversible scheme. The electric motors 1 and 2 are the cruising motors. Said vehicle further comprises a power source unit 5 and a control unit 6. The power source unit 5 typically includes two sets of batteries 7, which can operate alternatively, and each set is capable of supplying power to all electric motors. Since the present embodiment employs highly-effective low-voltage (48-72V) electric motors, the double set of batteries for the described vehicle will correspond to the standard set (120-150V) for a modern electric-motor car and will not require much additional space for its accommodation on board of the vehicle. In addition, said power source unit 5 may contain an electric generator 8 working on an organic or petrochemical fuel, which significantly increases the trip length and makes the vehicle more autonomous. Such a generator can charge one set of batteries (B2), while the electric motors are powered from another set of batteries (B1).

Said vehicle further comprises a mechanism 9, which turns the wheels, and a current rectifier unit 10, which is switched on when the start-up motor operates in the generator mode. The electric circuit switching, acceleration and deceleration regime selection, and vehicle driving are performed using controller 6. Some operations can be performed both in the manual and in the automated regime. Said controller operates in response to signals from the corresponding transducers measuring the velocity or motor rotation frequency (11), current in the electric circuits (12), turning angle (13), etc. The disclosed vehicle has motor-wheels and is therefore free from complicated reducing gear mechanisms, which ensures very high maneuverability and a nearly zero turning radius.

Each electric motor of the vehicle represents a motor-wheel comprising:
  (i) at least one circular magnetic conductor on which an even number of permanent magnets are uniformly arranged with a certain pitch;
  (ii) a circular frame separated from said magnetic conductor by an air gap and bearing an even number of electromagnets arranged in pairs one opposite to another; and
  (iii) a device switching the polarity of voltage applied to the electromagnets.

The electric motors can be of various types including a commutator pulsed inertial motor (FIG. 2), an inverter pulsed inertial motor (FIG. 3), a quadromotor (FIG. 4), an electric motor with two magnetic conductors (FIG. 5), etc.

An essential requirement is that the number ($m_1$) of phases in one electric motor (or several identical motors situated on one axis) and the number ($m_2$) of phases in the other electric motor (or several identical motors situated on another axis) obeys the relation $m_1 > m_2$. Then, the motor having $m_1$ phases is the start-up motor, which is used for accelerating the vehicle from, say, 0 to 40-60 km/h, while the motor with $m_2$ phases is the cruise motor and is used to provide for the vehicle motion at a velocity within 50-120 km/h. It is also desired that the number ($n_1$) of permanent magnets in the start-up electric motor and the number ($n_2$) of permanent magnets in the cruise electric motor obey the relation $n_1 > n_2$.

Figure 2:
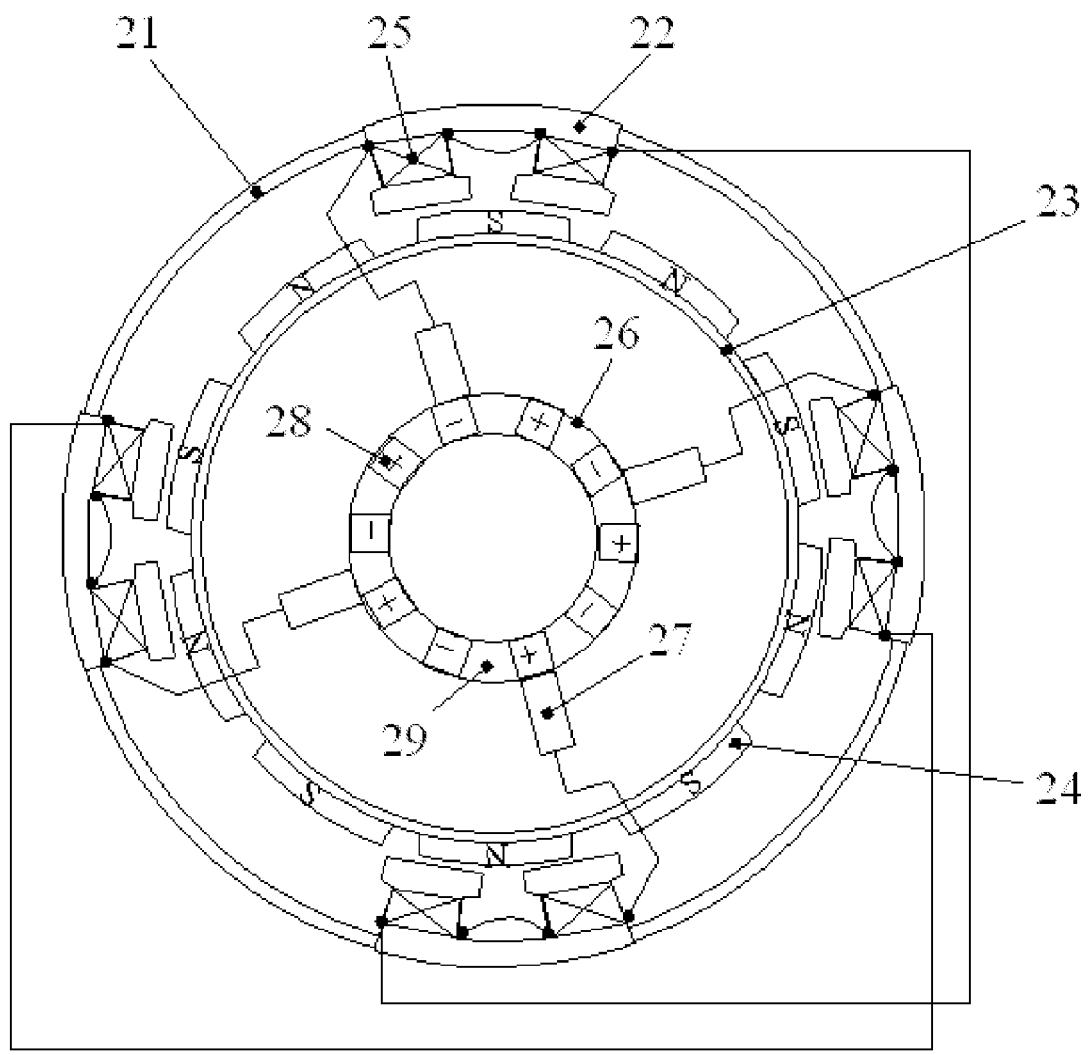
FIGS. 2-5 show different variants of a motor-wheel intended for use as start-up or cruising motors.

FIG. 2 shows a schematic diagram of a pulsed inertial electric motor, which can be used in vehicles of the disclosed invention. This motor has a rotor comprising a circular or annular frame 21 with an even number of electromagnets 22 (in this particular case, four) arranged in pairs one opposite to another (two phases).

The stator is arranged inside rotor and has an annular magnetic conductor 23 bearing an even number of permanent magnets 24 arranged at equal pitch and alternating polarity (in this particular case, there are ten permanent magnets). The rotor is separated from the stator by an air gap. Each of the electromagnets (arranged in pairs one opposite to another) consists of two coils 25 with opposite winding directions (clockwise against anticlockwise), which are connected in series, so that the end of the second coil in each electromagnet is connected to the beginning of the first coil of the adjacent electromagnet.

In the course of operation, the coils 25 of electromagnets 22 are supplied with power from a dc current source (not depicted in FIG. 2) via a collector distributor 26 and brushes 27. The collector distributor 26 is mounted on the stator body, while the brushes 27 are mounted on the rotor, move with the rotor relative to the current-carrying plates 28, and are capable of contacting with these plates. The collector distributor plates 28 are separated by insulating gaps 29 and connected in series with alternating polarity to the dc current source. The number of the collector distributor plates (in this example, ten) is equal to the number of permanent magnets in the stator.

All of the brushes 27 are connected to identical corresponding terminals of electromagnets 22, which are connected according to the following scheme. The coils of adjacent electromagnets are connected to each other in series, whereby the end of one electromagnet is connected to the beginning of the adjacent electromagnet, and the terminals not contacting with brushes are connected to identical terminals of the opposite coil.

The total number (n) of permanent magnets in the stator (in FIG. 2, n=10) and the number (m) of electromagnets in the rotor (in FIG. 2, m=4) are selected so as to obey the relations:

$$n = 10 + 4k,$$

$$m = 4 + 2L,$$

where k is an arbitrary integer (k=0, 1, 2, ... ) and L is any integer such that $0 \leq L \leq k$ (in FIG. 2, k=L=0).

The principle of operation of the electric motor according to the present invention is analogous to that of the traditional dc motor and is based on the electromagnetic forces of mutual attraction and repulsion arising during the interaction of electromagnets 22 of the rotor with permanent magnets 24 of the stator. When an electromagnet occurs in a position with its axis situated between the axes of two neighboring permanent magnets, the coils of this electromagnet are powered so that the resulting magnetic pole is opposite to the pole of the subsequent (in a given direction of rotation) permanent magnet and coincides with that of the previous permanent magnet. Thus, the given electromagnet is simultaneously repulsed from the previous permanent magnet and attracted to the subsequent permanent magnet. When the axes of electromagnet and permanent magnet coincide, the electromagnet is not connected to the dc current source because the brush passes over an insulating spacer between conducting plates. This position is traversed by means of inertia. Advantages of the proposed motor are related to a certain strictly determined ratio of the numbers of electromagnets and permanent magnets, their mutual arrangement, and the scheme of commutation.

If the rotor is mechanically rotated, the above motor can operate as an electric generator. The efficiency of generation increases with the number of phases. The number of phases in a start-up motor usually exceeds 10.

Figure 3:
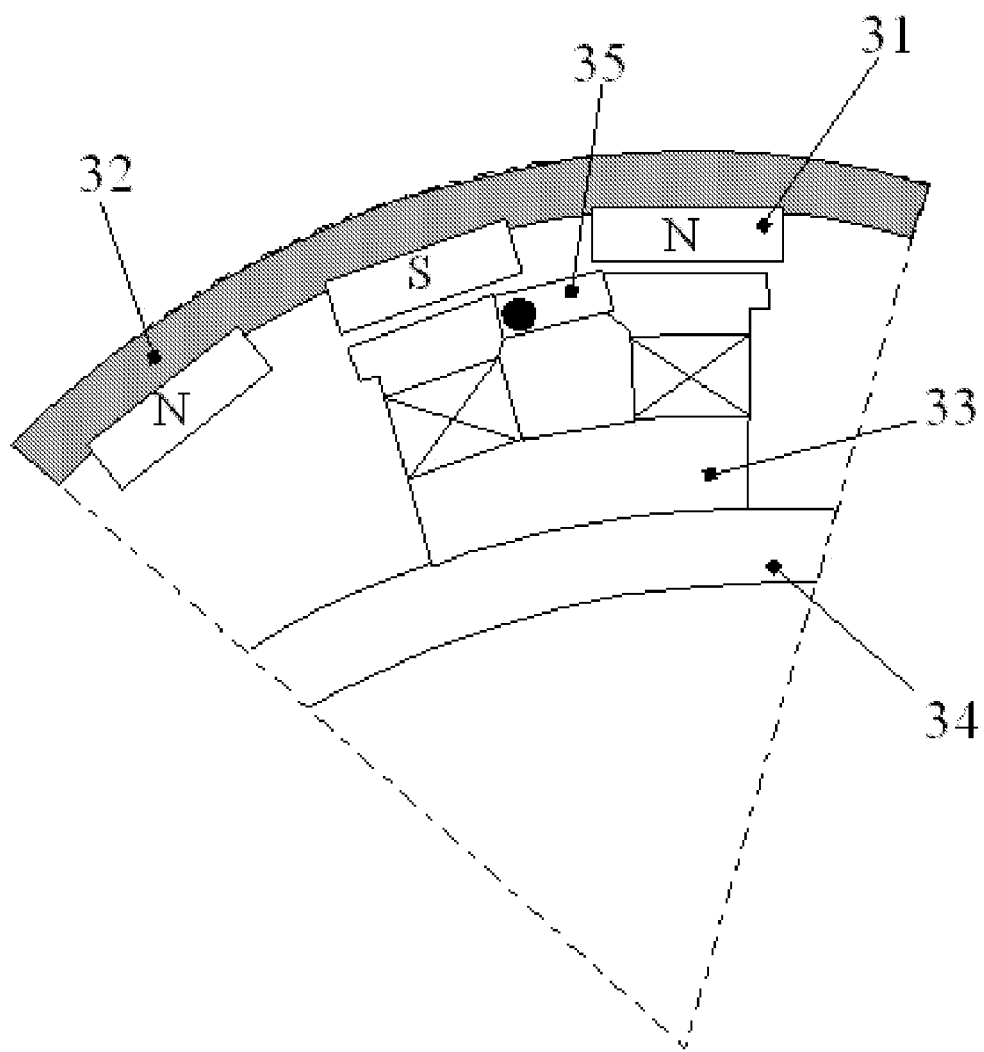

FIG. 3 shows a schematic diagram of a pulsed inertial electric motor of the inverter (brushless) type, in which permanent magnets 31 are situated on rotor 32 and electromagnets 33 are mounted on stator 34. The electromagnet design and the commutation scheme are analogous to those described above. This motor further comprises an inverter 35 (with an angle sensor and an electronic circuit not depicted in FIG. 3), which switches the polarity of voltage applied to the coils of electric magnets in accordance with the polarity of permanent magnets passing by the coils. The operation of this motor is otherwise analogous to that of the above variant with brushes.

The above variants of the pulsed inertial electric motors according to the disclosed invention can be used as both start-up and cruise motors, depending on the number of phases and permanent magnets in the system.

Figure 4:
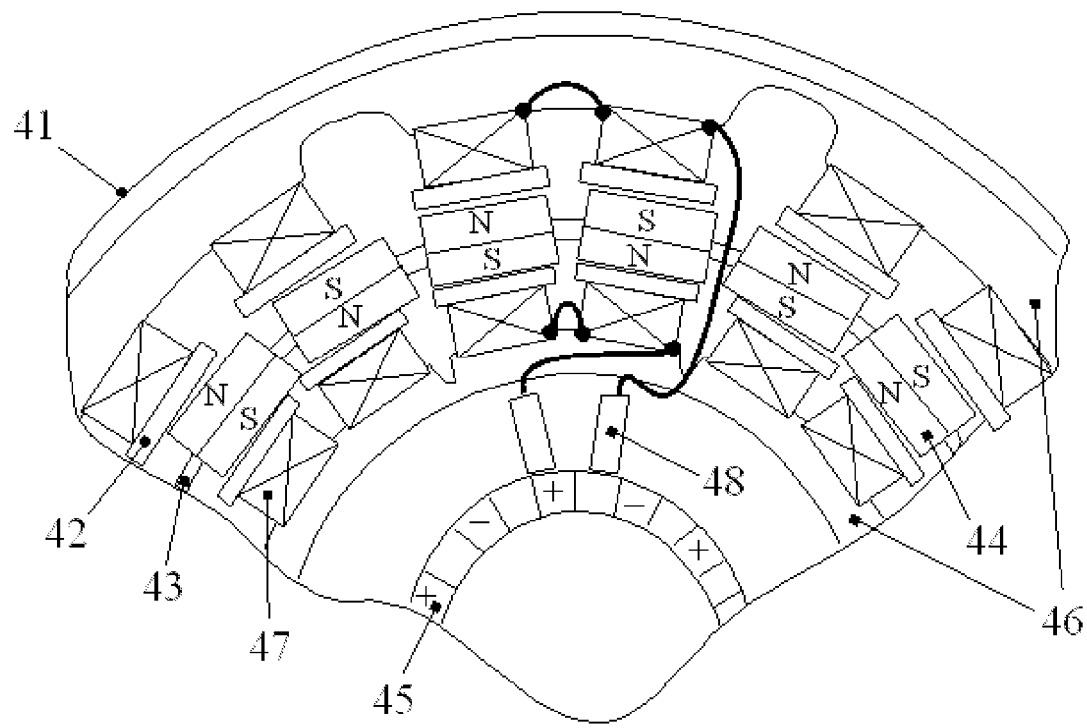

FIG. 4 shows a schematic diagram of an electric quadromotor comprising rotor 41 bearing electromagnets 42, stator 43 bearing permanent magnets 44, and a collector distributor 45 with current collectors 48. Here, the stator comprises a double circular magnetic conductor 43 bearing permanent magnets 44, which are arranged so that the permanent magnets on the outer magnetic conductor are facing outward and those on the inner magnetic conductor are facing inward. The rotor comprises a n-profiled circular frame 46, which bears an even number of electromagnets 42 arranged in pairs one opposite to another. Each of these electromagnets (quadro-electromagnets) consists of four coils 47 with opposite winding directions (clockwise against anticlockwise), which are connected in series. The electromagnets are arranged so that the circular magnetic conductor during rotation always occurs between coils 47. The terminals of the quadro-electromagnets are connected to the corresponding pairs of current collectors 48 arranged along the axial lines of the quadro-electromagnets. The current collectors are shifted relative to each other by an angle equal to that for the quadro-electromagnets. The number of current-carrying plates separated by insulating gaps in the collector distributor 45 is equal to the number of permanent magnets 44 on each side of the magnetic conductor 43.

The operation of this electric motor is also based on the electromagnetic forces of mutual attraction and repulsion between electromagnets of the rotor with permanent magnets of the stator. When an electromagnet occurs in a position whereby the axial lines of quadro-electromagnets 42 coincide with the axial lines of permanent magnets 44, the terminals of electromagnet coils 47 are commutated via current collectors 48 so that all the four poles of electromagnets become identical to those of the four poles of magnets in the stator. This leads to simultaneous repulsion from the previous permanent magnet and attraction to the subsequent permanent magnet of the opposite polarity. This electric motor can develop a large power and can withstand overloading with respect to the current. Such motors are most expediently used as the start-up motors.

Figure 5:
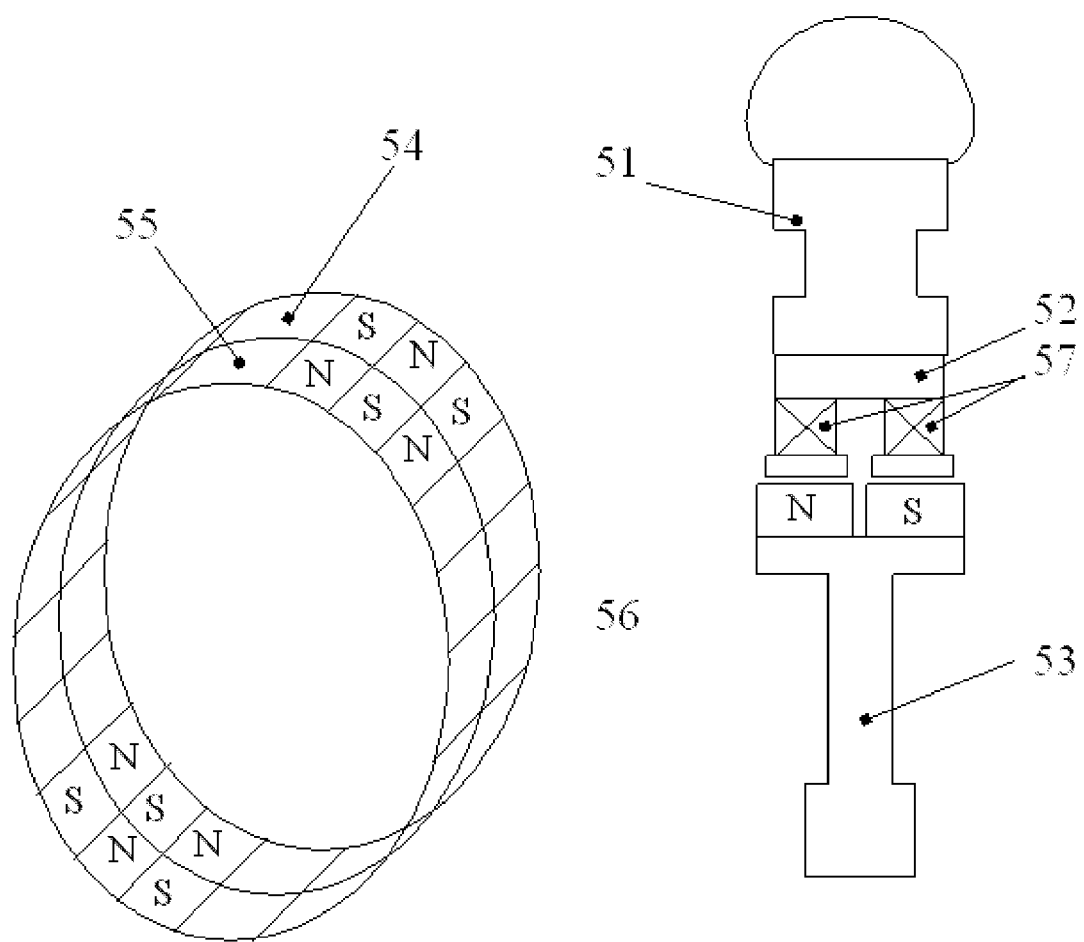

FIG. 5 shows a schematic diagram of another electric motor, which also comprises a rotor (51), bearing an even number of electromagnets (52), and a stator (53) arranged inside the rotor and comprised of two circular magnetic conductors (54 and 55) situated close to each other. Each magnetic conductor bears the same even number of permanent magnets 56 arranged at equal pitch and alternating polarity. Each of the electromagnets (arranged in pairs one opposite to another) consists of two coils 57 with opposite winding directions (clockwise against anticlockwise), which are connected in series and arranged so that one coil moves along one magnetic conductor (54) and the other coil moves along the other (adjacent) conductor (55). The commutation scheme of this electric motor is analogous to that described above for the pulsed inertial motor presented in FIG. 2. Such electric motors operate at a high-rate and are most expediently used as the cruise motors.

The types of electric motors, which can be used in the vehicles of embodiments of the present invention, are not restricted to those described above. An AWD vehicle of embodiments of the present invention, which contains at least two motor-wheels on one axis, usually implements an electric differential. The differentiation of electric motors stipulates their sequential operation, whereby blocking of one wheel (the corresponding motor is stopped) leads to redistribution of the electric current in the circuit and is not accompanied by overheating of the coils of electromagnets. The power supply voltage has to be calculated for the serial connection of electric motors.

Figure 6:
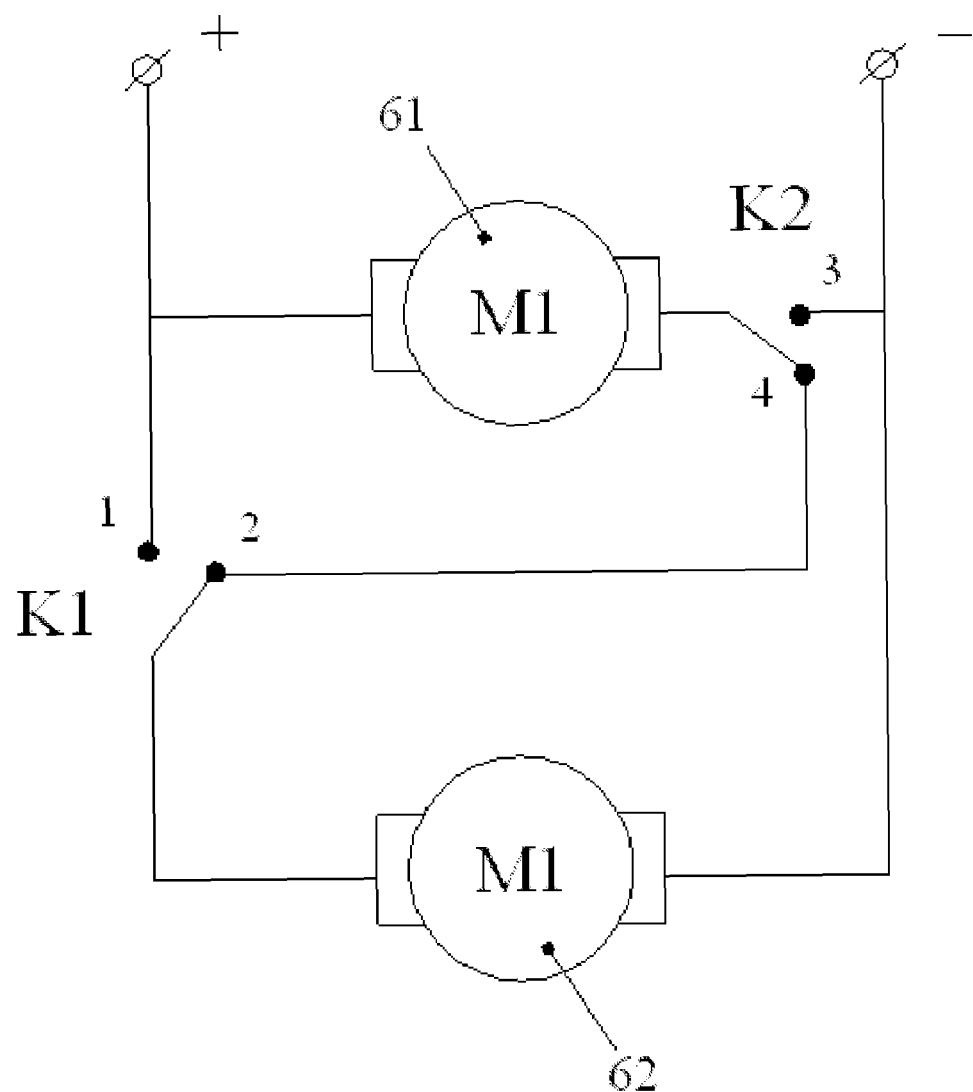
FIG. 6 is a schematic diagram of an electric differential.

FIG. 6 shows a schematic diagram of an electric differential for a vehicle with two cruise motors (61 and 62) on the same axis, which includes a relay making possible a change in the connection of motors to the power supply source from serial to parallel and vice versa. This connection can be used in order to provide for a forced regime in straight parts of the road. When key K1 is in position 2 and key K2 is in position 4, the two motors are connected in series and the wheels are differentiated. In a straight part of the road, key K1 is switched to position 1 and key K2 to position 3, after which the two motors are connected to the power supply source in parallel. As a result, the applied voltage is doubled and the frequency of rotation is increased. In order to restore the maneuverability, keys K1 and K2 are returned to their initial positions.

AWD vehicles of embodiments of the present invention may have various designs with different numbers of motor-wheels.

Table 1 presents data on the most typical use of start-up and cruise electric motors in various vehicles. Here, M1, M2 and M3 denote gearless pulsed inertial electric motors with the numbers of phases $m_1$, $m_2$, $m_3$ and the numbers of permanent magnets $n_1 > n_2 > n_3$ such that $m_1 > m_2 > m_3$ and $n_1 > n_2 > n_3$.

TABLE 1

|  | Front axis | | Rear axis | |
| --- | --- | --- | --- | --- |
|  | 1 | 2 | 1 | 2 |
| Electric-drive motorcycle | M1 |  | M2 |  |
|  | M2 |  | M1 |  |
| Electric-drive tricycle | M2 |  | M1 M1 |  |
| Four-wheel electric car | M1 M1 |  | M2 M2 |  |
|  | M2 M2 |  | M1 M1 |  |
| Six-wheel electric car (tractor, bus) | M2 M2 |  | M1 M1 | M1 M1 |
| Electric-drive train | M1 M1 | M1 M1 | M2 M2 | M2 M2 |
|  | M2 M2 | M2 M2 | M1 M1 | M1 M1 |
| High-speed electric car | M1 M1 |  | M2 M2 | M3 M3 |
|  | M1 M1 |  | M3 M3 | M2 M2 |
|  | M2 M2 |  | M3 M3 | M1 M1 |
|  | M2 M2 |  | M1 M1 | M3 M3 |
|  | M3 M3 |  | M1 M1 | M2 M2 |
|  | M3 M3 |  | M2 M2 | M1 M1 |

EXAMPLES

Figure 7:
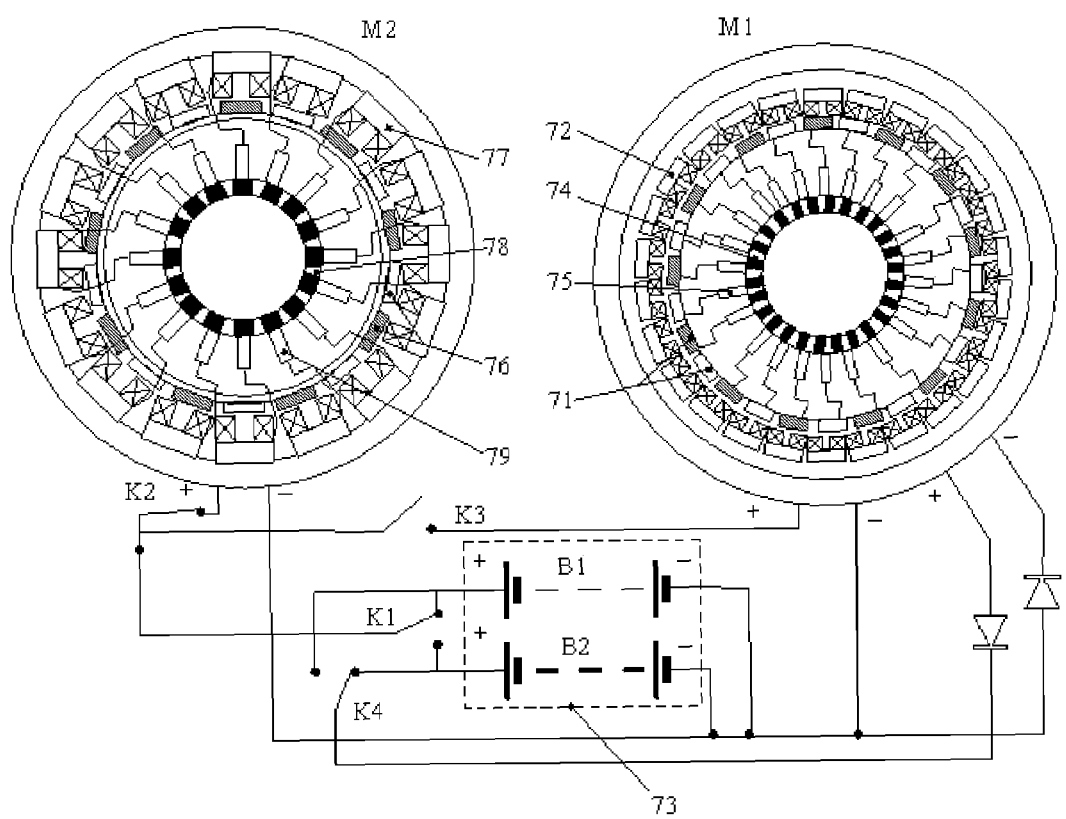
FIG. 7 is a schematic outline of an electric motorcycle of an embodiment of the present invention.

A prototype AWD electric motorcycle was designed and constructed based on motor-wheels employing pulsed inertial electric motors M1 and M2 (FIG. 7).

In this vehicle, the start-up electric motor M1 (the rear motor-wheel) comprised 26 permanent magnets (71) in the stator and 12 pairs (phases) of double-tooth electromagnets (72) in the rotor. The coils of electromagnets 72 were supplied with power from source 73 via collector distributor 74 and current collectors 75. The dc current source comprised two sets of batteries (B1 and B2), which could be alternatively switched by key K1. The design and commutation scheme of this electric motor were analogous to those described above for the pulsed inertial motor presented in FIG. 2. The power supply voltage of this vehicle was 72V. The start-up voltage in the vehicle acceleration regime was about 72V, the start-up current in this regime was 25-27 A, and the average current was about 12 A. Said electric motor ensured acceleration of the prototype vehicle up to 50 km/h within 3-4 seconds at a consumed power of about 900 W. After attaining a velocity of about 50 km/h, the start-up motor was switched off (by means of key K3) and the cruise motor situated on the front motor-wheel was switched on (by means of key K2). The switching of electric motors (analogous to the gear shifting) could be performed both manually and in an automated regime. In the latter case, the motors were switched in response to the motor current value. At a cruising speed of the motorcycle, the start-up motor M1 operated as an electric generator. The circuit of battery charging was switched by means of key K4.

The cruise motor M2 (the front motor-wheel) comprised 18 permanent magnets (76) in the stator and 8 pairs of double-tooth electromagnets (77) in the rotor. The coils of electromagnets 77 were supplied with power from source 73 via collector distributor 78 and current collectors 79. The current jump at the start of the cruise motor was absent because this motor was switched on at a vehicle velocity of about 50 km/h, and the working current was about 10 A. The power consumed by the cruise motor was about 720 W, and the cruising speed of the prototype motorcycle was 90-100 km/h.

Figure 8:
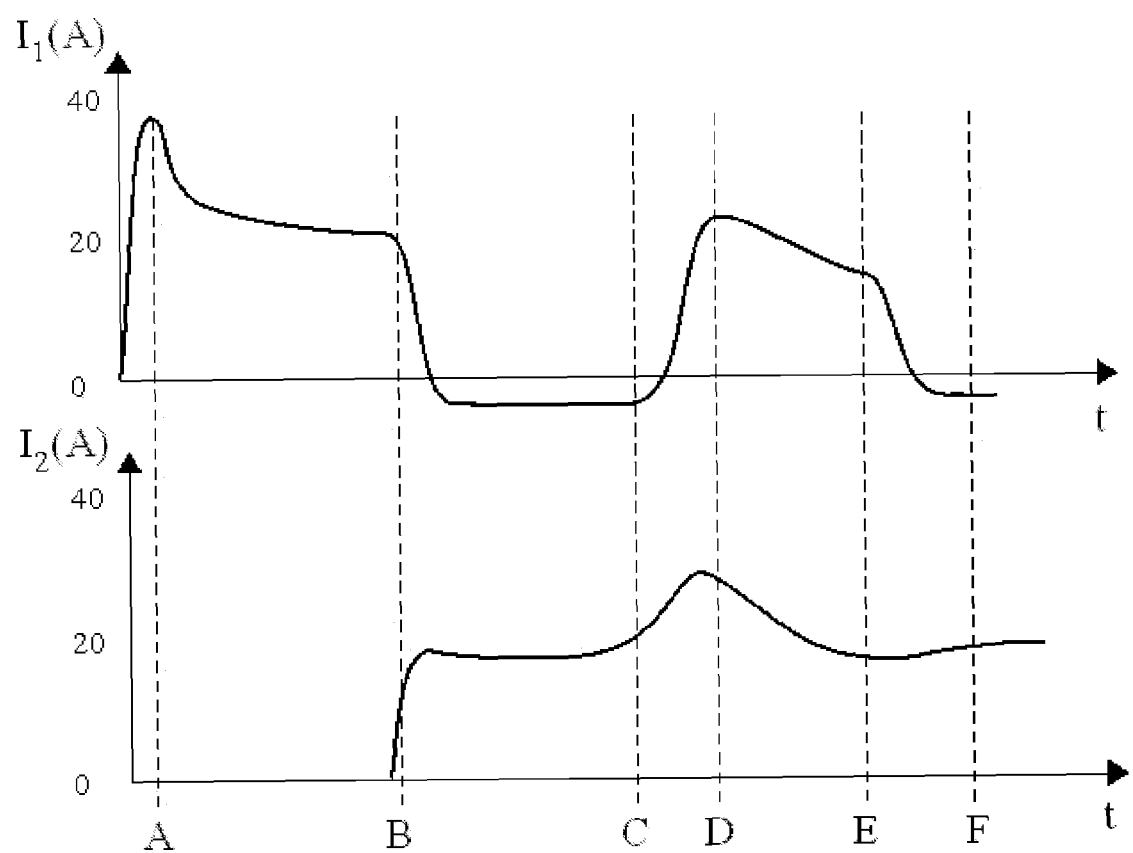
FIG. 8 shows a typical variation of current with time in the circuit of the electric motor operating in the start-up and cruising regimes.

FIG. 8 presents the typical time series of current variation in the circuit of electric motors M1 and M2 in the course of acceleration and motion of a vehicle according to an embodiment of the present invention. At the start-up of the vehicle, the current in the coils of the start-up motor exhibits a jump $I_1$, (FIG. 8, region 0-A) up to a level of about 40 A. As the motor attains a constant speed regime, the current drops to 25-27 A (region A-B). When the vehicle is accelerated up to a velocity of about 50 km/h, the start-up motor M1 is switched off and the cruise motor M2 is switched on (region B-C). The current jump at the start of the cruise motor is virtually absent. When the cruise motor attains a constant speed regime, the start-up motor begins to operate as an electric generator.

If the vehicle moves up a hill, the current $I_2$ in the cruise motor increases and, as this current reaches a certain level, the start-up motor M1 is switched in parallel to the cruise motor (region C-D). As a result, the current in the coils of both motors drops (region D-E). Upon surmounting the hill, the vehicle attains a cruising regime, whereby the cruise motor operates in a constant speed regime with a working current of about 10 A and the start-up motor operates as an electric generator charging the batteries with a current of about 4 A.

Thus, the disclosed AWD vehicle ensures economy of the energy (battery), exhibits a smooth acceleration regime, and possesses high dynamic characteristics.

The invention claimed is:

1. An all-wheel-drive vehicle including at least two gearless (direct-drive) electric motors, an electric power supply source, and an electric motor power supply control unit, wherein each of said motors comprises:
    (i) at least one annular magnetic conductor on which an even number of permanent magnets are uniformly arranged with a predetermined pitch;
    (ii) an annular frame separated from said magnetic conductor by an air gap and bearing an even number of electromagnets arranged in pairs one opposite to another; and
    (iii) a device for switching the polarity of a potential difference applied to said electromagnets, where a number $m_1$ of the pairs of opposing electromagnets in one electric motor and a number $m_2$ of the pairs of opposing electromagnets in the other electric motor obey the relation $m_1 > m_2$ and the power supply control unit is adapted to feed each electric motor separately and independently.

2. A vehicle as claimed in claim 1, wherein a number $n_1$ of said permanent magnets in one electric motor and a number $n_2$ of permanent magnets in the other electric motor obey the relation $n_1 > n_2$.

3. A vehicle as claimed in claim 1, wherein in each motor the annular magnetic conductor is situated on a stator, the annular frame is mounted on a rotor, and the device for switching the polarity of the potential difference applied to the electromagnets comprises
    (i) a collector distributor mounted on the stator body, containing current-conducting plates separated by insulating spacers and connected with alternating polarity to the power supply source, and
    (ii) current collectors mounted on the rotor, capable of contacting with plates of the collector distributor, and connected to coils of said electromagnets.

4. A vehicle as claimed in claim 1, wherein
    (i) said electromagnets consist of two coils with opposite winding directions, which are connected in series;
    (ii) the coils of adjacent electromagnets are also connected in series;
    (iii) corresponding terminals of opposing electromagnets not contacting with current collectors are connected to each other; and
    (iv) the number n of permanent magnets obeys the relation n=10+4/c, where k is an arbitrary integer (k=0, 1, 2, . . . ).

5. A vehicle as claimed in claim 4, wherein the number m of the pairs of opposing electromagnets obeys the relation m=2+L, where L is any integer such that $0 \leq L \leq k$.

6. A vehicle as claimed in claim 3, wherein the power supply unit is a direct current unit, and wherein in each motor positive current-conducting plates of said collector distributor are connected to a positive output of the dc power supply unit, and negative current-conducting plates of the collector distributor are connected to a case of the electric motor.

7. A vehicle as claimed in claim 3, wherein the power supply unit is a direct current unit, and wherein in each motor positive current-conducting plates of said collector distributor are connected to a positive output of the dc power supply unit, and negative current-conducting plates of the collector distributor are connected to a negative output of the dc power supply unit and insulated from a case of the electric motor.

8. A vehicle as claimed in claim 1, wherein in each motor a rotor is arranged outside a stator.

9. A vehicle as claimed in claim 1, wherein in each motor a rotor is arranged inside a stator.

10. A vehicle as claimed in claim 1, comprising at least two identical electric motors on the same axis.

11. A vehicle as claimed in claim 10, wherein at least two of said electric motors are connected in series to the electric power supply source.

12. A vehicle as claimed in claim 10, further comprising a means of changing the mode of connection of said electric motors to the power supply source from serial to parallel and vice versa.

13. A vehicle as claimed in claim 1, wherein said power supply source contains two sets of batteries alternately connected to different electric motors.

14. A vehicle as claimed in claim 1, wherein said magnetic conductor is situated on a rotor, the annular frame with electromagnets is situated on a stator, and said device for switching the polarity of the potential difference applied to the electromagnets comprises an inverter.

15. A vehicle as claimed in claim 1, wherein said power supply source includes an electric generator powered by an organic or petrochemical fuel.

16. A vehicle as claimed in claim 1, wherein said electric motor with a greater number of electromagnets is operable as an electric generator.

* * * * *